United States Patent [19]

Nikles et al.

[11] Patent Number: 5,686,136
[45] Date of Patent: Nov. 11, 1997

[54] AMINO-QUINONES, AND THEIR USE IN PROVIDING CORROSION RESISTANCE TO METALS

[75] Inventors: David Eugene Nikles; Jeng-Li Liang, both of Tuscaloosa, Ala.

[73] Assignee: University of Alabama, Tuscaloosa, Ala.

[21] Appl. No.: 260,965

[22] Filed: Jun. 15, 1994

Related U.S. Application Data

[63] Continuation-in-part of Ser. No. 101,535, Jul. 30, 1993, Pat. No. 5,596,098, and Ser. No. 19,917, Feb. 19, 1993, abandoned.

[51] Int. Cl.$^6$ ...................................................... B05D 7/00
[52] U.S. Cl. ........................ 427/127; 525/127; 525/453; 525/454; 428/692; 428/423.1; 428/900; 520/222; 520/229; 520/128; 520/125; 520/126; 520/363; 427/216; 427/221
[58] Field of Search .................... 525/127, 453, 525/454; 428/692, 423.1, 900; 427/127, 216, 221; 528/229, 222, 128, 125, 126, 363

[56] References Cited

U.S. PATENT DOCUMENTS

| | | | |
|---|---|---|---|
| 2,989,415 | 6/1961 | Horton et al. | 117/31 |
| 3,387,993 | 6/1968 | Flowers | 117/121 |
| 3,490,945 | 1/1970 | Slovinsky | 117/235 |
| 3,558,353 | 1/1971 | Harada et al. | 117/215 |
| 3,894,306 | 7/1975 | Sischka | 428/425 |
| 4,167,582 | 9/1979 | Takohashi et al. | 928/328 |
| 4,307,154 | 12/1981 | Hosaka et al. | 428/413 |
| 4,454,202 | 6/1984 | Komine et al. | 428/423.1 |
| 4,503,120 | 3/1985 | Yamauchi et al. | 428/336 |
| 4,555,449 | 11/1985 | Koleske et al. | 428/411.1 |
| 4,664,965 | 5/1987 | Okita et al. | 428/143 |
| 4,831,107 | 5/1989 | Erhan | 528/229 |
| 4,882,413 | 11/1989 | Erhan | 528/229 |
| 4,970,121 | 11/1990 | Tokunaga et al. | 428/412 |

OTHER PUBLICATIONS

Nickles et al., Amine Quinone Polyurethanes as Binders for Metal Particle Tape, American Chemical Society (Div. of Polymer Chemistry) 34(2), Aug. 1993 670–71.

Reactions of Biogenic Amines with Quinones, C. Ross Tindale, Aust.J.Chem., 1984, 37,611–7.

Molecular Complex Formation between Bridgehead Amines and Quinones, Michel J. Campbel & Basil D emetriou, J.Chem.Soc.Perkin Trans.II, 917–921,1983.

Kinetics & Mechanism of Molecular Interaction between 1,4–Benzoquinone & Piperdine, Muralikrish na & Krishnamurthy, Indian Journal of Chem., vol. 22A, Oct. 1983, pp. 858–860.

1,4–Carbazolchinone aus p–Benzochinon und primaeren aliphatischen Aminen. Das vermeintliche und das wahre 2–Methylamino–benzochinon, Monatshefte fuer Chemie 110, 51–62 (1979).

Liang and Nikles, Digests of International MAGnetics, p. BB–06, 1993.

"IEEE Trans. Magnetics" 1990, 26(5), 2098–2100, Y. Yamamoto, K. Sumiya, A. Miyake, M. Kishimoto, and T. Taniguchi.

(List continued on next page.)

*Primary Examiner*—Paul J. Thibodeau
*Assistant Examiner*—Mary Critharis
*Attorney, Agent, or Firm*—Oblon, Spivak, McClelland, Maier & Neustadt, P.C.

[57] ABSTRACT

A method for providing improved specific saturation magnetization of coated iron pigments by coating the iron pigments through contacting them with a solution of a copolymer of a reactive aminoquinone, removing the excess copolymer and drying the coated pigments is provided.

13 Claims, 3 Drawing Sheets

OTHER PUBLICATIONS 2-(N-Alkyl-p-hydroxyanilino)-1,4-benzochinone aus p-Benzochinonen und primaeren aliphatischen A minen, Robert Ott, Erfried Pinter & Peter Kajtna, Monatshefte fuer Chemie 111, 813–820(1980).

Quinone Chemistry, Synthesis of 3-Methoxy[2,1] benzisoxazole and 3-Methoxynaphth [2,3-c] isoxazole quinones, Tomas Torres, S.V. Eswaran & Wolfram Schaefer, J.Heterocyclic Chem., 22, 697 (1985).

Spectrophotometric Determination of Aliphatic Primary and Secondary Amines by Reaction with p-B enzoquinone, Saad S.M. Hassan, M.L. Iskander and N.E. Nashed, Talanta, vol.32,No.4, pp. 301–305, 1985.

AMINO-QUINONES, AND THEIR USE IN PROVIDING CORROSION RESISTANCE TO METALS

This is a Continuation-in-Part of application Ser. No. 08/101,535, filed Jul. 30, 1993, now U.S. Pat. No. 5,596,098, and a Continuation-in-Part of application Ser. No. 08/019,917, filed Feb. 19, 1993, now abandoned.

BACKGROUND OF THE INVENTION

1. Field of the Invention

The present invention relates to aminoquinones, copolymers containing them and use of these aminoquinones and copolymers to provide corrosion resistance to metals in a variety of media, such as information storage devices, and various metal particle containing fluids. The present invention further relates to a method for using the aminoquinone copolymers to improve the saturation magnetization of iron particles coated therewith.

2. Discussion of the Background

Flexible magnetic information storage media have become one of the principle means of storing information over the last two decades. This is primarily because such information storage media are permanent and versatile and have a high storage capacity. Additionally, the information stored on these types of devices can be easily erased and the device used repeatedly.

During the last two decades, the flexible magnetic recording industry has striven to increase the information storage capacity for various magnetic information storage media, with metal particle tape and magnetooptic discs emerging as leading candidates. However, recent reports of corrosion problems for metal particle tape have been cause for considerable concern in the industry (D. Speliotis *IEEE Trans. Magnetics* 1990, 26(1) 124–126; D. Speliotis, Symposium on Corrosion of Electronic Materials and Devices, Electrochemical Society, Seattle, Wash. October 1990). Recent attempts to improve corrosion resistance in metal particle tape have used variants of metal particle tape which contain ceramic coated iron particles (Y. Yamamoto, K. Sumiya, A. Miyake, M. Kishimoto, and T. Taniguchi, *IEEE Trans. Magnetics* 1990, 26(5), 2098–2100). However, these have the drawback of being fragile and difficult to prepare using conventional methods. Further, when the iron particles are coated with a ceramic the specific saturation magnetization of the coated particle is 35–50% lower than uncoated iron, resulting in poorer performance in the coated particle. Thus, the issue of the reliability of metal particle tape, and magnetic recording media in general, while maintaining high magnetization properties, remains unanswered.

One method of improving the corrosion resistance of metal particle based information storage media, would be to provide a coating for the metal particles which maintains the desirable characteristics of the information storage device, of flexibility, high capacity and product strength, while greatly improving the corrosion resistance and thus the lifetime of the device. However, until the discovery of the present invention, the above method has provided little improvement compared to the conventional polyurethane binder compositions used in magnetic information storage media.

Metal working fluids, or lubricants, are widely used in industry to aid in the manufacture of metal parts and components. These fluids provide the function of lubrication, heat transfer and cooling, and the suspension and removal of metal fines. Conventionally, various additives such as specialty surfactants and corrosion inhibitors are used to improve the properties and efficacy of these metal working fluids. Because water-based fluids account for about 14% of the metal working fluid market, and are increasing at 10% per year, corrosion resistance is an increasingly important issue.

SUMMARY OF THE INVENTION

Accordingly, one object of the present invention is to provide a reactive aminoquinone which can be incorporated into corrosion resistant binder compositions in information storage media.

Another object of the present invention is to provide a copolymer useful as a binder in information storage media, which contains as a constituent monomer a reactive aminoquinone, and which results in improved corrosion resistance of the magnetic particles in the device.

Another object is to provide an information storage device having improved corrosion resistance and improved mechanical properties.

A further object of the present invention is to provide aminoquinones useful for providing corrosion resistance in a variety of fluid media such as lubricating oils, metal working fluids and hydraulic fluids.

Another object of the present invention is to provide a method for preventing corrosion in fluid media.

Another object of the present invention is to provide a method for protecting iron particles from corrosion while simultaneously providing a specific saturation magnetization level previously unachievable in a coated iron particle.

These and other objects have been satisfied by the discovery of reactive aminoquinones of the formula I

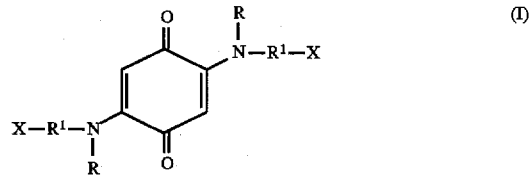

wherein R is hydrogen, branched, linear or cyclic $C_1$–$C_6$ alkyl, aralkyl, or phenyl which may be substituted by linear, branched or cyclic $C_1$–$C_4$ alkyl, —$NO_2$, F, $OR^2$, $NR^3_2$, wherein $R^2$ and $R^3$ are linear, branched or cyclic $C_1$–$C_6$ alkyl, aralkyl or phenyl, $R^1$ is a linear, branched or cyclic $C_1$–$C_{18}$ alkylene chain, phenylene, aralkylene, alkarylene, or —$(CH_2CH_2$—$O)_n$—$CH_2$—$CH_2$—, wherein n is an integer from 1 to 50, X is hydroxy, epoxy, vinyl aryl, vinyl, vinyloxy, acrylate, methacrylate or acylchloro or of the formula II

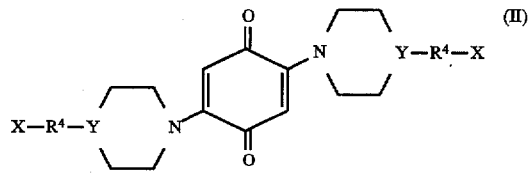

wherein Y is N or CH $R^4$ is linear or branched $C_1$–$C_6$ alkyl and X is as defined above, their use in preparing copolymers useful as binders in information storage devices and information storage devices containing these copolymers as binders and having improved corrosion resistance and mechanical properties.

In an additional embodiment, the present invention provides aminoquinones of formula VI

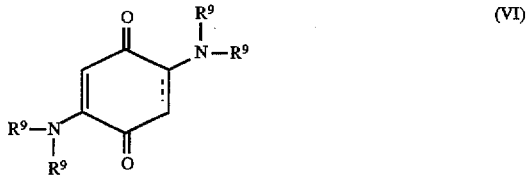

where $R^9$ is linear or branched alkyl having from 1 to 18 carbons, $C_6$–$C_{10}$ aryl which may be unsubstituted or which may have one or more substituents selected from halogen, nitro, hydroxy, linear or branched $C_1$–$C_{18}$ alkyl, linear or branched $C_1$–$C_{18}$ alkyl ether, linear or branched $C_1$–$C_{18}$ alkyl thioether, linear or branched $C_1$–$C_{18}$ alkyl polyether of formula $(OCH_2CH_2)_m$—$OC_nH_{2n+1}$ where m is from 1 to 100 and n is from 1 to 18, sulfonic acid, sulfonate, sulfonamide;

or $R^9$ can be functionalized alkyl of formula

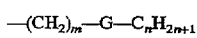

where m is from 2 to 18, n is from 1 to 18, and G is a difunctional linking group, such as an ether, thioether, ester, amide, sulfoxide, sulfone;

or $R^9$ is functionalized alkyl of formula

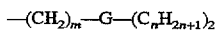

where m is from 2 to 18, n is from 1 to 18, and G is a trifunctional linking group, such as an amine or amide;

or aminoquinones of formula VII

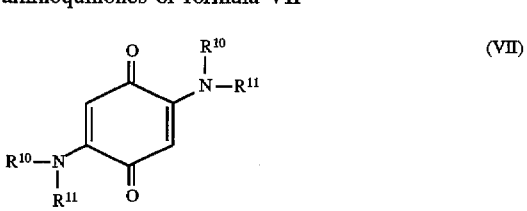

where $R^{10}$ is H, linear or branched $C_1$–$C_{18}$ alkyl, or phenyl and $R^{11}$ is linear or branched $C_1$–$C_{18}$ alkyl, $C_6$–$C_{10}$ aryl which may be unsubstituted or which may have one or more substituents selected from halogen, nitro, hydroxy, linear or branched $C_1$–$C_{18}$ alkyl, linear or branched $C_1$–$C_{18}$ alkyl ether, linear or branched $C_1$–$C_{18}$ alkyl thioether, linear or branched $C_1$–$C_{18}$ alkyl polyether of formula $(OCH_2CH_2)_m$—$OC_nH_{2n+1}$ where m is from 1 to 100 and n is from 1 to 18, sulfonic acid, sulfonate, sulfonamide;

or $R^{11}$ is functionalized alkyl of formula

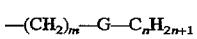

where m is from 2 to 18, n is from 1 to 18, and G is a difunctional linking group, such as an ether, thioether, phenylene, ester, amide, sulfoxide, sulfone;

or $R^{11}$ is functionalized alkyl of formula

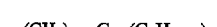

where m is from 2 to 18, n is from 1 to 18, and G is a trifunctional linking group, such as an amine, amide or phenylene and their use as additives for providing corrosion resistance to a variety of fluid media.

As a further embodiment of the reactive aminoquinones for use in preparing copolymers useful as binders in information storage devices and information storage devices containing these copolymers as binders and having improved corrosion resistance and mechanical properties are compounds of formulas (VIII) and (IX)

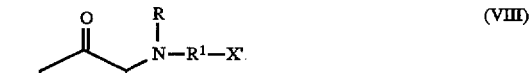

wherein R, $R^1$, and $R^4$ are as described above, X' is vinyl aryl, vinyl, vinyloxy, acrylate, methacrylate or epoxy and Z is H or —$NR^{12}R^{13}$ wherein $R^{12}$ and $R^{13}$ are each independently H, branched, linear or cyclic $C_1$–$C_6$ alkyl or phenyl which may be substituted by linear, branched or cyclic $C_1$–$C_4$ alkyl, —$NO_2$, F, $OR^{14}$, $NR^{15}_2$, wherein $R^{14}$ and $R^{15}$ are linear, branched or cyclic $C_1$–$C_6$ alkyl, aralkyl or phenyl.

Still a further object of the present invention is satisfied by coating iron particles with the reactive aminoquinone derived copolymers of the present invention to prevent corrosion of the particles while maintaining the saturation magnetization at high levels compared to previously obtained levels in coated iron particles.

BRIEF DESCRIPTION OF THE FIGURES

A more complete appreciation of the invention and many of the attendant advantages thereof will be readily obtained as the same becomes better understood by reference to the following detailed description when considered in connection with the accompanying figure, wherein.

DETAILED DESCRIPTION OF THE PREFERRED EMBODIMENTS

Figure 1:
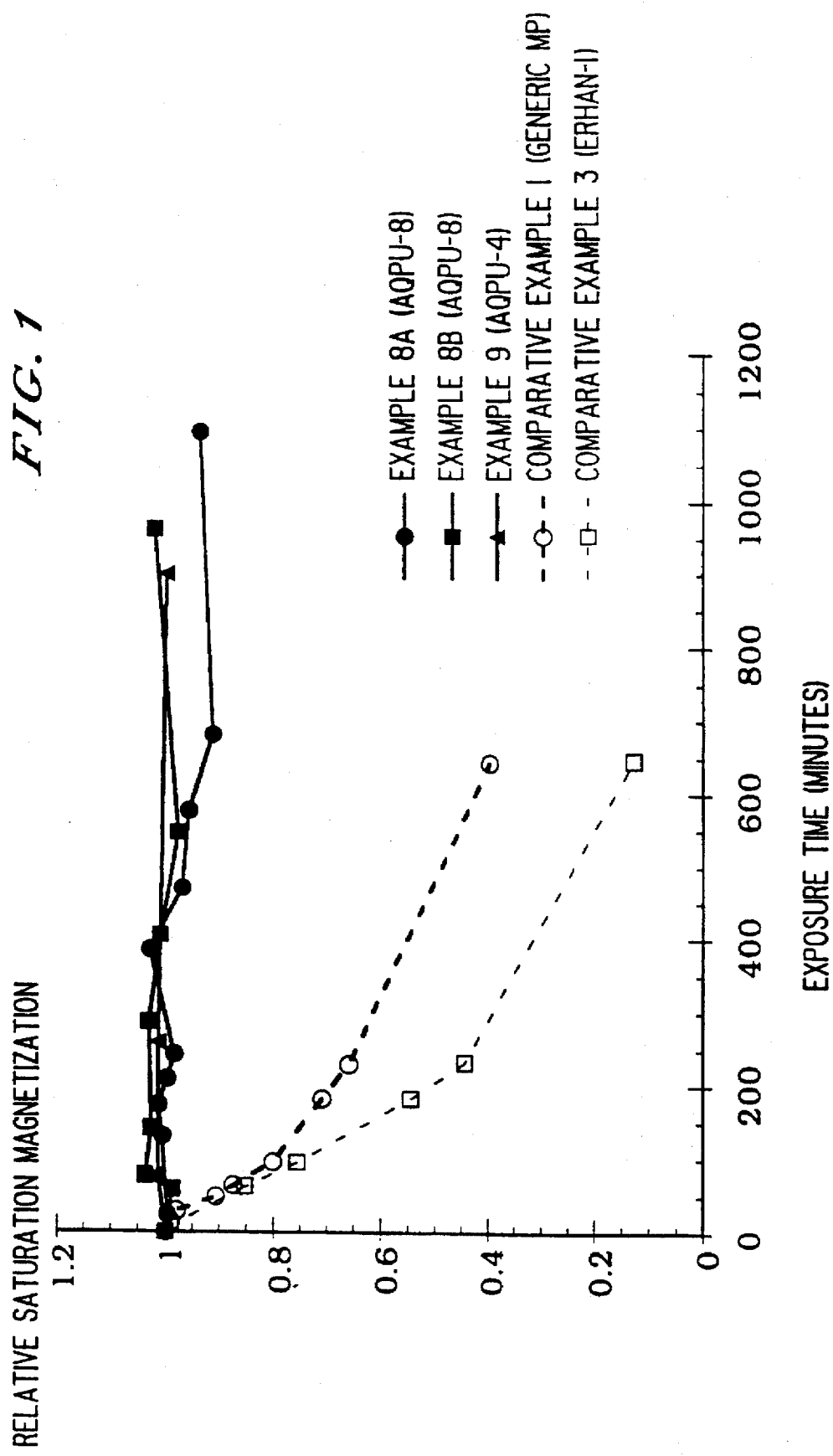
FIG. 1 is a graphical presentation of the corrosion results obtained with copolymers containing the reactive aminoquinones of the present invention.
Figure 2:
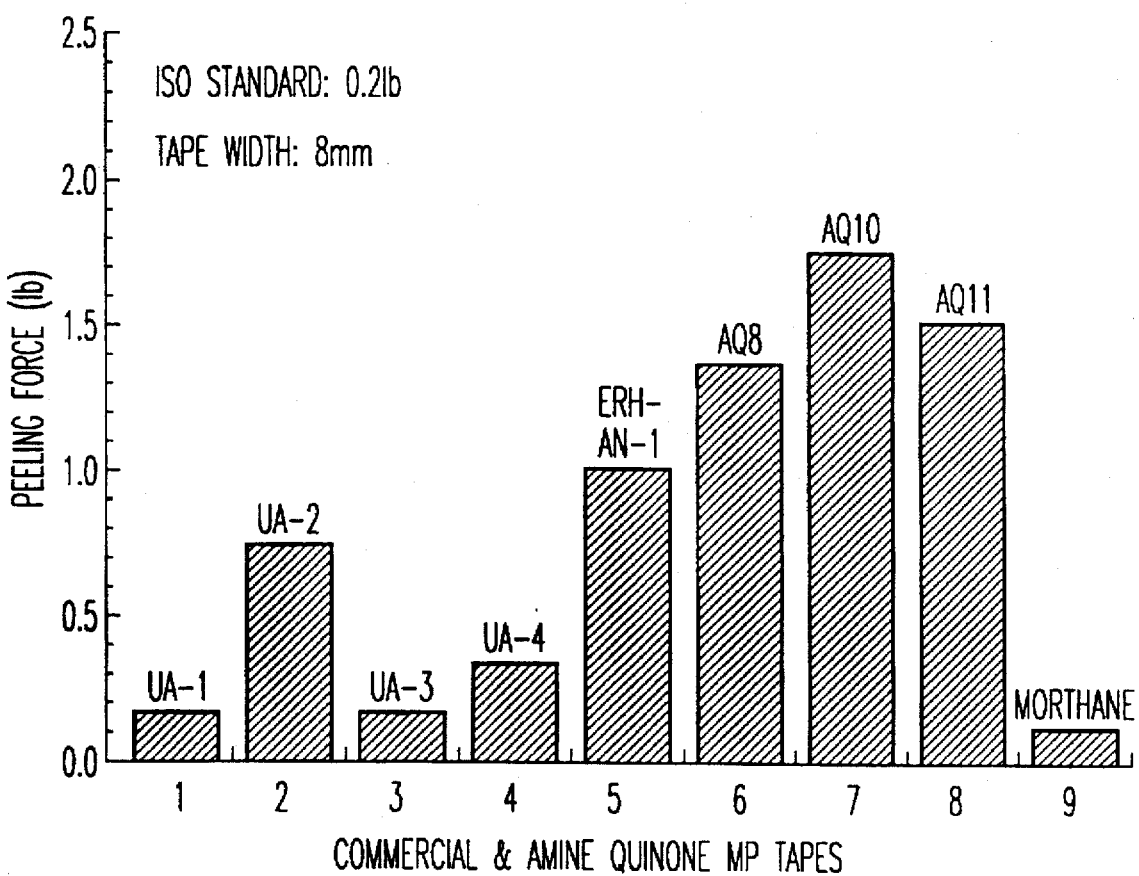
FIG. 2 is a graphical presentation of the improvement in adhesion of a polyetherurethane binder with the polyester base film in metal particle tape using the reactive aminoquinones of the present invention.

The present invention relates to reactive aminoquinone compounds of the formula I

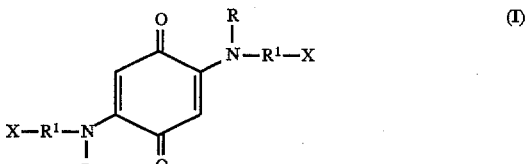

wherein R is hydrogen, branched, linear or cyclic $C_1$–$C_6$ alkyl, aralkyl, or phenyl which may be substituted by linear, branched or cyclic $C_1$–$C_4$ alkyl, —$NO_2$, F, $OR^2$, $NR^3_2$, wherein $R^2$ and $R^3$ are linear, branched or cyclic $C_1$–$C_6$ alkyl, aralkyl or phenyl, $R^1$ is a linear, branched or cyclic $C_2$–$C_{18}$ alkylene chain, phenylene, aralkylene, alkarylene, or —($CH_2CH_2$—O)$_n$—$CH_2$—$CH_2$—, wherein n is an integer from 1 to 50, X is hydroxy, epoxy, vinyl aryl, vinyl, vinyloxy, acrylate, methacrylate or acylchloro or of the formula II

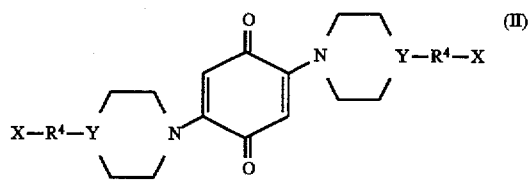

wherein Y is N or CH $R^4$ is linear or branched $C_1$–$C_6$ alkyl and X is as defined above.

In addition to the difunctionalized aminoquinones above, the present invention also includes mono-functional aminoquinones for use in preparing copolymers useful as binders in information storage devices to provide improved corrosion resistance and mechanical and magnetic properties where the mono-functional aminoquinones are compounds of formulas (VIII) and (IX)

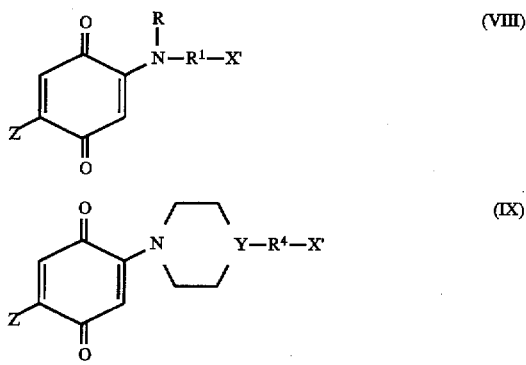

wherein R, $R^1$, and $R^4$ are as described above, X' is vinyl aryl, vinyl, vinyloxy, acrylate, methacrylate or epoxy and Z is H or —$NR^{12}R^{13}$ wherein $R^{12}$ and $R^{13}$ are each independently H, branched, linear or cyclic $C_1$–$C_6$ alkyl or phenyl which may be substituted by linear, branched or cyclic $C_1$–$C_4$ alkyl, —$NO_2$, F, $OR^{14}$, $NR^{15}{}_2$, wherein $R^{14}$ and $R^{15}$ are linear, branched or cyclic $C_1$–$C_6$ alkyl, aralkyl or phenyl.

In another embodiment, the aminoquinone of the present invention is copolymerized, preferably to form block, segmented block, or random copolymers, with one or more comonomers reactive with the X group present in the aminoquinone monomer.

In an additional embodiment, the copolymer of the present invention is used to form a binder for magnetic particles in an information storage device.

The aminoquinones of the present invention can be prepared using conventional synthetic methods for reacting amine compounds with quinone. Suitable methods include oxidative amination of benzoquinone (see Torres et al J. Heterocyclic Chem. 23, pp. 697–699 (1985)) and direct amination (see Erhan et al, U.S. Pat. Nos. 4,831,107 and 4,882,413). Particularly preferred is the method of oxidative amination of benzoquinone using calcium hypochlorite as the oxidant. The mono and difunctionalized aminoquinones can be prepared by the above methods by appropriate selection of reactant stoichiometry and sequential addition of two different amines for the monofunctionalized amines bearing an additional non-functionalized amino group.

In the aminoquinone of the present invention, R is preferred to be hydrogen, methyl, ethyl, benzyl, phenethyl, tolyl, xylyl, ethylphenyl, diethylphenyl and (methyl ethyl) phenyl, with hydrogen, methyl and ethyl most preferred.

$R^1$ is preferred to be linear, branched or cyclic $C_1$–$C_6$ alkylene, phenylene or —$CH_2CH_2C_6H_4$—, with the $C_1$–$C_6$ alkylenes being most preferred.

X is a group capable of reacting with comonomer (B) in the copolymer of the present invention, described below. Preferably, X is hydroxy, epoxy, vinyl, vinyloxy, acryl, methacryl or acylchloro, with hydroxy, epoxy and vinyl being most preferred for compounds of formulas I and II and preferably vinyl aryl, vinyl, vinyloxy, acrylate, methacrylate or acylchloro for compounds of formulas VIII and IX.

Particularly preferred aminoquinones of the present invention include the compounds of formulas III and X

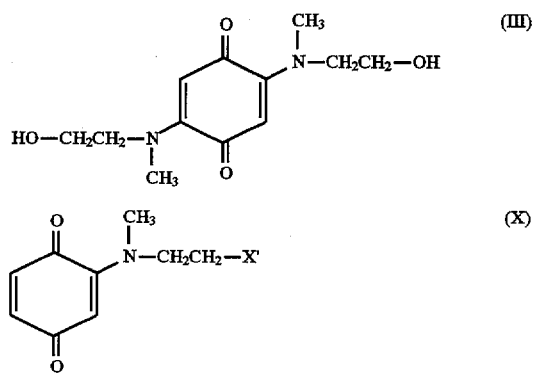

The copolymers of the present invention can be prepared by melt or solution polymerization using conventional techniques.

The copolymers are block, segmented block or random copolymers comprising (A) 3 to 60% by weight, preferably 10–30% by weight, of units derived from one or more reactive aminoquinones of the present invention, and (B) 40 to 97% by weight, preferably 70–90% by weight, of units derived from one or more comonomers having at least one functional group reactive with the reactive aminoquinone of part (A).

The comonomers (B) are selected to have reactivity with the group X of the aminoquinone, and with each other if a block, or segmented block copolymer is desired. In the present discussion, a block copolymer is a copolymer of general structure —BBBBAAAABBBB— indicating that both the A and B blocks are polymeric, while a segmented block copolymer has a general structure —BBBBABBBB—, indicating that the A block is monomeric or oligomeric (degree of polymerization≦10) with the B block being polymeric. If (B) comprises more than one type of comonomer, such as diisocyanate and diol in preparation of a polyurethaneaminoquinone copolymer, at least one of the comonomers (B) must be reactive with (A), with the remaining comonomers (B) being reactive with one another.

The copolymers of the present invention are preferably polymers which are conventionally used as binders in magnetic information storage devices, which have been modified by inclusion into the polymer chain of 3 to 30% by weight of units derived from the reactive aminoquinones of the present invention. Suitable comonomers (B) include monomers used in preparing polyurethanes, polyester polyurethanes, poly(vinyl acetate-co-vinyl chloride), epoxy and phenoxy resins, cellulose nitrate, poly(vinylidene bichloride-co-acylonitrile), poly(butadiene-co-styrene), poly(butadiene-co-acrylonitrile), polyamides, poly(vinyl acetal), poly(vinyl butyral), poly(vinyl pyridine) copolymers, polycarbonates, polysulfones, polyimides, polyetherimides, polyether ether ketones, phenolformaldehyde resins, melamine-formaldehyde resins, poly(acrylate), poly(methacrylate), poly(acrylic acid) and poly(methacrylic acid). Preferred copolymers of the present invention are polyurethane/aminoquinone copolymers, epoxy resin/aminoquinone copolymers, and polyester polyurethane/aminoquinone copolymers, with polyurethane/aminoquinone copolymers and polyester polyurethane/aminoquinone copolymers most preferred.

The copolymer of the present invention has a number average molecular weight of from 1000 to 200,000, preferably from 15,000 to 100,000.

In the preparation of the preferred copolymers of the present invention, when X=OH, the polyurethane constituent of the copolymer can be prepared from one or more comonomers (B) comprising 30 to 50% by weight of a diisocyanate and 30 to 50% by weight of a diol. In particular, preferred diisocyanates have the formula $$O=C=N-R^5-N=C=O$$

wherein $R^5$ is a linear, branched or cyclic $C_2$-$C_{18}$ aliphatic group, —$C_6H_4$—$CH_2$—$C_6H_4$—, or an aryl group which is unsubstituted, or mono or disubstituted by linear, branched or cyclic $C_1$-$C_6$ alkyl, with methylene di-p-phenyldiisocyanate (MDI), diisocyanatotoluene and isophorone diisocyanate and positional isomers thereof being most preferred.

Preferred diols of the polyurethane portion of the copolymer are diols of formula HO—$R^6$—OH wherein $R^6$ is a linear, branched or cyclic $C_2$-$C_{18}$ aliphatic group or oligomeric diols. Preferred oligomeric diols include polycaprolactone diol having a degree of polymerization of from 1 to 50, poly(butylene adipate) diol having a degree of polymerization of from 1 to 20, poly(ethylene terephthalate) diol having a degree of polymerization of from 1 to 20, poly(tetrahydrofuran) diol having a degree of polymerization of from 2 to 50, poly(1,2-butylene glycol) diol having a degree of polymerization of from 2 to 50, poly(1,2-propyleneglycol) diol having a degree of polymerization of from 2 to 1000, poly(1,3-propylene glycol) diol having a degree of polymerization of from 2 to 1000, poly(ethylene glycol) diol having a degree of polymerization of from 2 to 1000 and poly(carbonate) diol having a degree of polymerization of from 1 to 20.

When X=vinyl, vinyloxy, acrylate or methacrylate, comonomer (B) is preferably one or more monomers selected from the group consisting of acrylates, methacrylates, $C_2$-$C_6$ olefins, styrene and vinyl naphthalene. When X=epoxy, comonomer (B) is preferably one or more comonomers selected from the group consisting of $C_2$-$C_4$ alkylene oxide, styrene oxide and epichlorohydrin.

In an alternative embodiment, the aminoquinones of the present invention are compounds of the formula (IV):

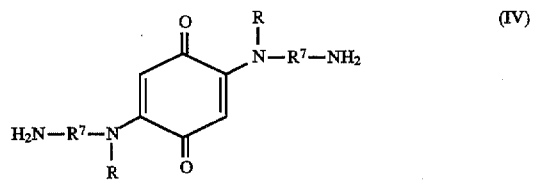

wherein R is as previously described; and
$R^7$ is —$(CH_2)_n$—, phenyl (—$C_6H_4$—), —$C_6H_4$—O—$C_6H_4$—, —$C_6H_4$—CO—$C_6H_4$—, —$C_6H_4$—$SO_2$—$C_6H_4$—, biphenyl, —$CH_2$—$C_6H_4$—$CH_2$—, 2,5-tolyl-diyl, 2,4-tolyl-diyl, 2,4-anisyl-diyl; wherein n is an integer from 2 to 12, preferably from 2 to 6.

The aminoquinones of formula (IV) may be used to form polyimides for use as a binder in a magnetic information storage device. The polyimides derived from aminoquinones of formula (IV) may prepared by condensation of one or more aminoquinones of formula (IV) with one or more tetracarboxylic dianhydrides. Any tetracarboxylic dianhydride may be used, with dianhydrides of the formulas below:

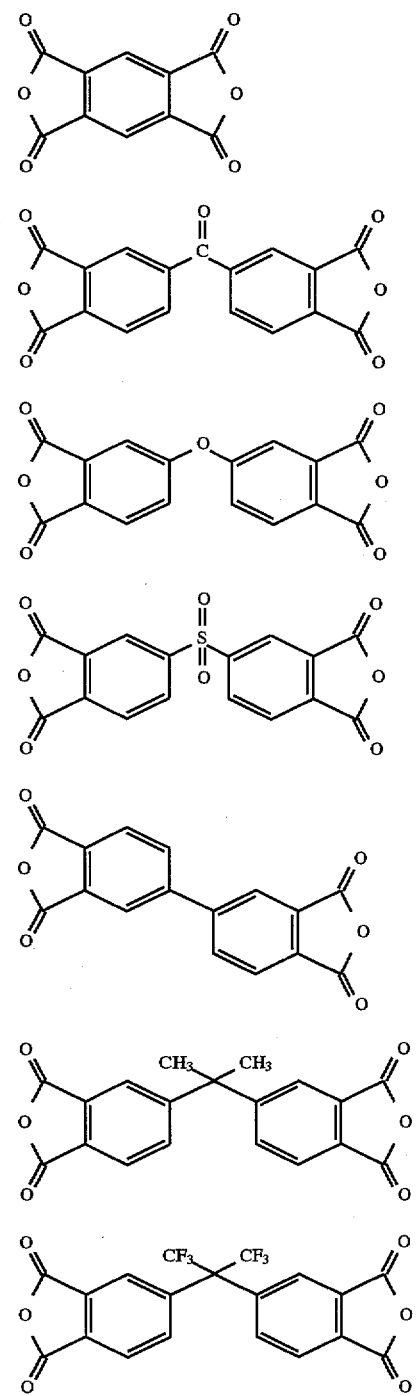

-continued

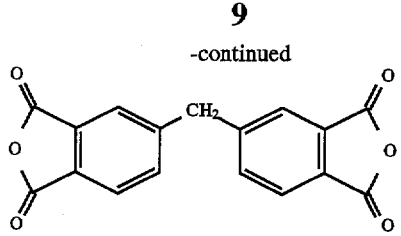

being preferred.

In another embodiment, the aminoquinones of the present invention are compounds of formula (V):

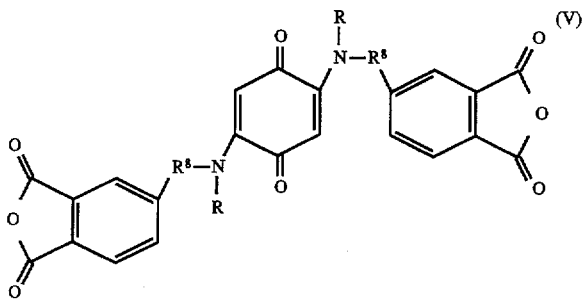

wherein R is as previously described; and $R^8$ is —O—$(CH_2)_n$—, phenoxy, phenylsulfonyl or a single bond, wherein n is an integer from 2 to 12, preferably 2 to 6.

The aminoquinones of formula (V) may also be used to prepare polyimides by condensation of one or more aminoquinones of formula (V) with one or more diamines. While any diamine may be used in the preparation of polyimides by condensation with the aminoquinones of formula (V), aromatic diamines are preferred, with 1,4-diaminobenzene, 1,3-diaminobenzene, 4,4'-diamino-diphenyl ether, 4,4'-diamino-benzophenone, 2,4-diaminotoluene, 2,5-diaminotoluene and 4,4'-diamino-diphenyl sulfone being most preferred.

The information storage device of the present invention comprises a support, magnetic particles and a binder to bind the magnetic particles to the support and provide corrosion resistance to the magnetic particles. The binder comprises the copolymer of the present invention described above. In formulating the binder, 30–100% by weight, preferably 40–75% by weight, of the copolymer of the present invention is mixed with one or more conventional binder polymer components used in magnetic particle information storage devices as noted above. Suitable conventional binder components include commercial polyurethanes, polyester polyurethanes and epoxy resins, such as the polyurethane MORTHANE CA-271, commercially available from Morton International.

The information storage device of the present invention can be prepared by conventional methods, such as those described in the chapter entitled "Magnetic Tape" from Kirk-Othmer Encyclopedia of Chemical Technology and the references cited therein. A key difference between the device of the present invention and conventional devices is the use of the aminoquinone-containing copolymer of the present invention as the binder in the device. The device may be any magnetic information storage device which requires the use of magnetic particles, which would be susceptible to corrosion. Preferred devices include magnetooptic discs and magnetic particle tape.

The magnetic particles present in the device of the present invention may be any conventional magnetic particles used in information storage media. For magnetic particle tape, Fe particles or alloys such as iron nitrides are preferred. For thin film media prepared by vapor deposition of the metal on the medium, Co and Fe/Co alloys are preferred in recording heads and Fe/Gd alloys and Fe/Yb/Co alloys are preferred in magnetooptic discs.

By using the aminoquinone-containing copolymers of the present invention as binders in magnetic particle information storage devices, improved corrosion resistance is obtained while maintaining or improving the mechanical properties of the device.

In a further embodiment of the present invention, aminoquinones are provided for use as additives to a variety of fluid media imparting corrosion resistance to metals in contact with the fluid medium, the aminoquinones have either formula VI

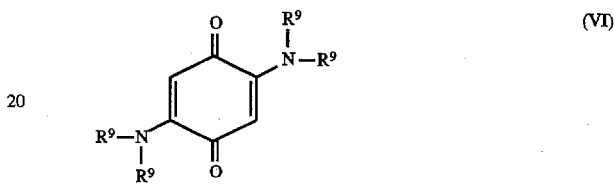

where $R^9$ is linear or branched alkyl having from 1 to 18 carbons, $C_6$–$C_{10}$ aryl which may be unsubstituted or which may have one or more substituents selected from halogen, nitro, hydroxy, linear or branched $C_1$–$C_{18}$ alkyl, linear or branched $C_1$–$C_{18}$ alkyl ether, linear or branched $C_1$–$C_{18}$ alkyl thioether, linear or branched $C_1$–$C_{18}$ alkyl polyether of formula $(OCH_2CH_2)_m$—$OC_nH_{2n+1}$ where m is from 1 to 100 and n is from 1 to 18, sulfonic acid, sulfonate, sulfonamide;

or $R^9$ can be functionalized alkyl of formula

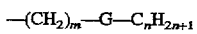

where m is from 2 to 18, n is from 1 to 18, and G is a difunctional linking group, such as an ether, thioether, ester, amide, sulfoxide, sulfone;

or $R^9$ is functionalized alkyl of formula

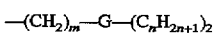

where m is from 2 to 18, n is from 1 to 18, and G is a trifunctional linking group, such as an amine or amide;

or aminoquinones of formula VII

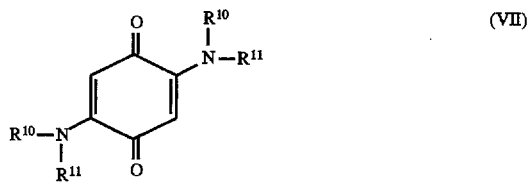

where $R^{10}$ is H, linear or branched $C_1$–$C_{18}$ alkyl, or phenyl and $R^{11}$ is linear or branched $C_1$–$C_{18}$ alkyl, $C_6$–$C_{10}$ aryl which may be unsubstituted or which may have one or more substituents selected from halogen, nitro, hydroxy, linear or branched $C_1$–$C_{18}$ alkyl, linear or branched $C_1$–$C_{18}$ alkyl ether, linear or branched $C_1$–$C_{18}$ alkyl thioether, linear or branched $C_1$–$C_{18}$ alkyl polyether of formula $(OCH_2CH_2)_m$—$OC_nH_{2n+1}$ where m is from 1 to 100 and n is from 1 to 18, sulfonic acid, sulfonate, sulfonamide;

or $R^{11}$ is functionalized alkyl of formula

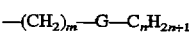

where m is from 2 to 18, n is from 1 to 18, and G is a difunctional linking group, such as an ether, thioether, phenylene, ester, amide, sulfoxide, sulfone;

or $R^{11}$ is functionalized alkyl of formula

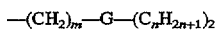

where m is from 2 to 18, n is from 1 to 18, and G is a trifunctional linking group, such as an amine, amide or phenylene or aminoquinones of formula I or II wherein X is —O—CO—NHR$^{16}$ with R$^{16}$ being branched, linear or cyclic $C_1$–$C_6$ alkyl or phenyl which may be substituted by linear, branched or cyclic $C_1$–$C_4$ alkyl, —$NO_2$, F, OR$^{17}$, NR$^{18}_2$, wherein R$^{17}$ and R$^{18}$ are linear, branched or cyclic $C_1$–$C_6$ alkyl, aralkyl or phenyl.

The aminoquinones of formula VI, VII or I or II wherein X is —O—CO—NHR$^{16}$ may be used singly or in any combination thereof. The aminoquinone should be added to the fluid medium prior to coming into contact with the metal to be protected, but may be added after contact is initiated.

The same methods are used to prepare the compounds of formulas VI or VII as those used to prepare the compounds of formulas I and II described above. The compounds of formula I or II wherein X is —O—CO—NHR$^{16}$ can be prepared by condensing the compounds of formula I or II, wherein X is —OH, with a monoisocyanate of formula R$^{16}$NCO according to conventional synthetic methods.

The fluid media may be any aqueous or non-aqueous fluid in contact with metal, and is preferably a conventional lubricating oil, metal working fluid, or hydraulic fluid. The aminoquinones are added in an amount of from 0.1 to 10% by weight, preferably 3 to 7% by weight based on the amount of the fluid medium.

If necessary the aminoquinone may be functionalized on the amine group constituent using conventional organic synthesis techniques in order to improve compatibility (solubility or dispersibility) with the fluid medium. Such functionalization may include reactions as amination, carboxylation, hydroxylation, nitration or sulfonation.

As a further embodiment of the present invention, much improved magnetic properties can be provided in coated iron pigments using the copolymers of the present invention as a coating on the iron pigment. Metal particle tape has the best data storage capacity and data storage rate of any particulate tape medium. The information storage layer conventionally contains small iron particles of approximately 0.1 μm diameter. Iron has a specific saturation magnetization ($\sigma_s$) of 218 emu/g, but is highly sensitive to atmospheric corrosion. Conventionally, this corrosion problem is solved by coating the iron pigments with a ceramic barrier layer. Unfortunately, when the pigments are thus coated the specific saturation magnetization drops by 35–50% to the range of 110 to 140 emu/g.

However, when the iron pigments are coated with the copolymers of the present invention, one not only obtains the improved corrosion resistance discussed above, but a further advantage is obtained. The pigments coated with the copolymers of the present invention have been found to retain their specific saturation magnetization at high levels of from 160 to 180 emu/g, which is a decrease of only 18–27% from the magnetization of iron.

When coating the pigments with the copolymers of the present invention, any conventional coating method may be used, such as contacting the pigments with a solution of the copolymer in a solvent capable of dissolving the copolymer. Suitable solvents include tetrahydrofuran (THF), dimethylformamide (DMF), diethyl ether, dioxane and other polar solvents capable of dissolving the copolymers of the present invention. The iron pigments can be prepared by reduction of iron oxide by treatment with hydrogen at temperatures from 350° to 500° C. for a time period of from 2 hours to 8 hours, preferably 450° to 500° C. for approximately 4 to 6 hours. The pigments are preferably treated with the copolymer solution for a period of from 1 to 48 hours at a temperature of from 10° C. to the boiling point of the solvent, preferably from room temperature (approx. 25° C.) to 35° C., the excess solution then separated from the coated pigments and the coated pigments rinsed with a solvent to remove excess copolymer. The coated pigments are then dried and ready for use.

Having generally described this invention, a further understanding can be obtained by reference to certain specific examples which are provided herein for purposes of illustration only and are not intended to be limiting unless otherwise specified.

EXAMPLES

Example 1

Preparation of the amine-quinone monomer 2,5-bis(N-2-hydroxyethyl-N-methylamino)-1,4-benzoquinone (AQM-1)

A 500 mL, three-necked, round bottom flask was equipped with a mechanical stirrer, a reflux condenser, and a dropping funnel. Tetrahydrofuran (300 mL) was added to the flask, cooled to 5° C. Powdered calcium hypochlorite (22.8 g, 0.160 mol) was added to the tetrahydrofuran and the suspension was stirred for 10 minutes. To this suspension was added benzyltrimethylammonium chloride (0.74 g, 4.0 mmol), followed by 1,4-benzoquinone (17.30 g, 0.1600 mol). A solution of N-(2-methylamino)ethanol (24.04 g, 0.3200 mol, dissolved in 100 ml of THF) was added dropwise over a period of 40 minutes. After the addition of N-(2-methylamino)ethanol, the reaction mixture was stirred for 1.5 hours and then heated at 40° C. for 1 hour. After cooling to room temperature, the reaction mixture was filtered through Spectra/Mesh® polypropylene filter (500 μm mesh opening, supplied by Spectrum Medical Industries, Inc) to remove the calcium hypochlorite particles. Fine particles of the crude product were recovered from the filtrates by filtration through sintered glass funnel. Boiling ethanol was poured into the filtration funnel to extract amine-quinone monomer. This ethanol solution was then filtered through the funnel by suction. A 450 ml solution was collected after repeated extraction. After cooling the solution overnight in a refrigerator at 4° C. the product crystallized. The crystals were collected by filtration and further purified by a second extractive recrystallization from ethanol (yield 76%, m.p. 167° C.). The product consisted of fine orange-brown needles with a purple cast in reflection. Elemental analysis: found C 56.70%, H 7.19%, N 11.03%, calculated for $C_{12}H_{16}N_2O_4$, C 56.68%, H 7.13%, N 11.02%. $^1$NMR (CD$_3$SOCD$_3$): 3.1 ppm (s, CH$_3$N, 6H), 3.5–3.6 ppm (q, CH$_2$N, 4H), 3.7–3.8 ppm (t, CH$_2$O, 4H), 4.7–4.8 ppm (t, —OH, 2H), 5.28 ppm (s, quinone-H, 2H). Exact mass by mass spectroscopy 254.13, calculated 254.29.

Example 2

Preparation of the amine-quinone monomer 2,5-bis[4-(2-hydroxyethyl)piperazinyl]-1,4-benzoquinone (AQM-2)

A 500 mL, three-necked, round bottom flask was equipped with a mechanical stirrer, a reflux condenser, and a dropping funnel. Tetrahydrofuran (300 mL) was added to the flask and cooled to 5° C. Powdered calcium hypochlorite (22.8 g, 0.160 mole) was added to the tetrahydrofuran and the suspension was stirred for 10 minutes. To this solution was added benzyltrimethylammonium chloride (0.74 g, 4.0 mmol), followed by 1,4-benzoquinone (17.30 g, 0.1600 mole). A solution of 1-(2-hydroxyethyl)piperazine (41.66 g, 0.3200 mole, dissolved in 100 ml of THF) was added dropwise over a period of 40 minutes. After the addition of 1-(2-hydroxyethyl)piperazine, the reaction mixture was stirred for 1.5 hours and then heated at 40° C. for 1 hour. After cooling to room temperature, the reaction mixture was filtered through Spectra/Mesh® polypropylene filter to remove the calcium hypochlorite particles. Fine particles of the crude product were recovered from the filtrates by filtration through sintered glass funnel. Boiling ethanol was poured into the filtration funnel to extract amine-quinone monomer. This ethanol solution was then filtered through the funnel by suction. A 450 ml amine-quinone ethanol solution was collected after repeated extraction. The product was crystallized after cooling the solution overnight in a refrigerator at 4° C. The crystals were then collected by filtration and further purified by a second extractive recrystallization from ethanol (yield 66%, m.p. 165° C.). The product consisted of fine red crystals.

Example 3

Synthesis of Amine-Quinone Polyurethane AQPU-2

Polycaprolactone diol (25 g, 0.02 mole) was dehydrated in three-necked flask by stirring at 100° C. under reduced pressure for 30 minutes, and then cooled to 60° C. The polycaprolactone diol was vigorously mixed with AQM-1 (1 g, 0.004 mol) for 1 hour at 85° C. Methylene di-p-phenyldiisocyanate (MDI) (6.17 g, 0.025 mol) was added to the flask under nitrogen. The mixture was vigorously mixed for one minute. One drop of stannous 2-ethylhexanoate at 60° C. was added to the flask and mixed for 30 second, followed by degassing under reduced pressure for one minute. The reaction mixture was poured into a beaker before being cured in oven at 80° C. under vacuum. The number average molecular weight $M_n$ was determined by gel permeation chromatography to be 43,400.

Example 4

Synthesis of an Amine-Quinone Polyurethane, AQPU-3

The required amount of polycaprolactone diol (5 g, 0.004 mole) was dehydrated in three-necked flask by stirring at 100° C. under reduced pressure for 30 minutes, and then cooled to 40° C. The corresponding amount of isophorone diisocyanate (IPDI) (1.798 g, 0.008 mole) was dissolved in THF and was added into the flask under nitrogen. The final concentration of the polycaprolactone diol and the IPDI was 10% (w/v). The mixture was refluxed gently for 1 hour and cooled to 40° C. The corresponding amount of AQM-1 (0.75 g, 0.003 mole) was added into the prepolymer solution, followed by three drops of stannous 2-ethylhexanoate. The mixture was refluxed for 3 hours, with constant stirring. The resultant polymer was precipitated from excess methanol before being stored overnight. The precipitate was isolated by filtering and extensively washed with methanol. It was then dried in vacuum at 60° C. The number average molecular weight $M_n$ was determined by gel permeation chromatography to be 14,860.

Example 5

Synthesis of an Amine-Quinone Polyurethane, AQPU-4

The required amount of polycaprolactone diol (5 g, 0.004 mole) was dehydrated in three-necked flask by stirring at 100° C. under reduced pressure for 30 minutes, and then cooled to 40° C. The corresponding amount of IPDI (2.59 g, 0.0116 mole) was dissolved in THF and was added into the flask under nitrogen. The final concentration of the polycaprolactone diol and the IPDI was 10% (w/v). The mixture was refluxed gently for 1 hour and cooled to 40° C. The corresponding amount of AQM-1 (1.75 g, 0.007 mole) was added into the prepolymer solution, followed by three drops of stannous 2-ethylhexanoate. The mixture was refluxed for 3 hours, with constant stirring. The resultant polymer was precipitated from excess methanol before being stored overnight. The precipitate was isolated by filtering and extensively washed with methanol. It was then dried in vacuum at 60° C. The number average molecular weight $M_n$ was determined by gel permeation chromatography to be 11,400.

Example 6

Synthesis of an Amine-Quinone Polyurethane, AQPU-8

The required amount of poly(1,2-butylene glycol) (5 g, 0.0025 mole) was dehydrated in three-necked flask by stirring at 100° C. under reduced pressure for 30 minutes, and then cooled to 40° C. The corresponding amount of tolylene-2,4-diisocyanate (TDI) (1.72 g, 0.0098 mole) was dissolved in dimethyl formamide (DMF) and was added into the flask under nitrogen. The final concentration of the poly(1,2-butylene glycol) and TDI was 10% (w/v). The mixture was stirred gently at 80° C. for 2 hours and cooled to 40° C. The corresponding amount of AQM-1 (1.75 g, 0.007 mole) was added into the prepolymer solution, followed by three drops of stannous 2-ethylhexanoate. The mixture was stirred at 90° C. for 3 hours, with constant stirring. The resultant polymer was precipitated from excess methanol before being stored overnight. The precipitate was isolated by filtering and extensively washed with methanol. It was then dried in vacuum at 60° C. This composition contained 20.7 weight percent AQM-1. This polymer was completely soluble in tetrahydrofuran, toluene, and cyclohexanone. The number average molecular weight, by GPC, was 89,300.

Example 7

Synthesis of an Amine-Quinone Polyurethane, AQPU-10

The required amount of poly(1,2-butylene glycol) (5 g, 0.0025 mole) was dehydrated in three-necked flask by stirring at 100° C. under reduced pressure for 30 minutes, and then cooled to 40° C. The corresponding amount of MDI (2.46 g, 0.0098 mole) was dissolved in dimethyl formamide (DMF) and was added into the flask under nitrogen. The final concentration of the poly(1,2-butylene glycol) and MDI was 10% (w/v). The mixture was stirred gently at 80° C. for 2 hours and cooled to 40° C. The corresponding amount of AQM-1 (1.75 g, 0.007 mole) was added into the prepolymer solution, followed by three drops of stannous 2-ethylhexanoate. The mixture was stirred at 90° C. for 4 hours, with constant stirring. The resultant polymer was precipitated from excess methanol before being stored overnight. The precipitate was isolated by filtering and extensively washed with methanol. It was then dried in vacuum at 60° C. This composition contained 20 weight percent AQM-1. This polymer was completely soluble in tetrahydrofuran, toluene, and cyclohexanone. The number average molecular weight, by GPC, was 81,100.

Example 8

Synthesis of an Amine-Quinone Polyurethane, AQPU-11

The required amount of poly(1,2-butylene glycol) (5 g, 0.0025 mole) was dehydrated in three-necked flask by stirring at 100° C. under reduced pressure for 30 minutes, and then cooled to 40° C. The corresponding amount of MDI (1.927 g, 0.0077 mole) was dissolved in dimethyl formamide (DMF) and was added into the flask under nitrogen. The final concentration of the poly(1,2-butylene glycol) and MDI was 10% (w/v). The mixture was stirred gently at 80° C. for 2 hours and cooled to 40° C. The corresponding amount of AQM-2 (1.75 g, 0.0048 mole) was added into the prepolymer solution, followed by three drops of stannous 2-ethylhexanoate. The mixture was stirred at 90° C. for 4 hours, with constant stirring. The resultant polymer was precipitated from excess methanol before being stored overnight. The precipitate was isolated by filtering and extensively washed with methanol. It was then dried in vacuum at 60° C. This composition contained 20.2 weight percent AQM-2. This polymer was completely soluble in tetrahydrofuran, toluene, and cyclohexanone. This polyurethane has better thermal stability in air. It has only 3% weight loss at 255° C.

Example 9

Films Containing Amine-Quinone Polyurethane, AQPU-8, and Iron Pigments

Two different binder polymer solutions were prepared: 1) a wetting binder solution contained 1.84 g of AQPU-8, 16.03 g tetrahydrofuran, 16.52 g of cyclohexanone, and 1.76 g toluene; and 2) a binder solution contained 2.33 g of MORTHANE CA-271 (a commercial polyurethane binder from Morton International), 2.63 g tetrahydrofuran, 5.21 g cyclohexanone, and 5.24 g toluene. Both solutions were continuously mixed on the wrist-action shaker overnight to effect dissolution of the polymers. The next day the polymer solutions were used to prepare a magnetic coating dispersion. To a 150 mL beaker was added 16.82 g of iron pigments (a generic iron pigment used in the preparation of commercial metal particle magnetic tape) and the wetting binder solution. The mixture was thoroughly stirred in order to completely wet the iron pigments. The slurry was charged to an Eiger Mini 50 mill, 25.42 g of cyclohexanone was added, and the mill was started at full speed. After ten minutes milling, a mixture of 0.33 g carbon black, 1.07 g alumina, 0.23 g stearic acid, and 0.23 g butyl stearate was added to the mill. While the milling continued, 0.46 g MONDUR CB-701 (a commercial Polyisocyanate crosslinker from Mobay Coatings Division) was dissolved in the MORTHANE CA-271 binder solution. After 50 minutes milling, the MORTHANE solution was added to the mill and the milling was continued for ten more minutes. After a total of one hour of milling the dispersion was discharged into a glass bottle and ready for coating trials.

Films were coated onto 3 mil thick polyester base film by hand-drawing using a Gardner Blade. Immediately after coating the films were longitudinally oriented in a 2000 gauss magnetic field. The films were dried overnight in a convection oven at 60° C.

Example 10

Films Containing Amine-Quinone Polyurethane, AQPU-4, and Iron Pigments

Two different binder polymer solutions were prepared: 1) a wetting binder solution contained 1.81 g of AQPU-4, 16.64 g tetrahydrofuran, 16.46 g of cyclohexanone, and 4.23 g toluene; and 2) a binder solution contained 2.37 g of MORTHANE CA-271 (a commercial polyurethane binder from Morton International), 2.79 g tetrahydrofuran, 5.24 g cyclohexanone, and 5.32 g toluene. Both solutions were continuously mixed on the wrist-action shaker overnight to effect dissolution of the polymers. The next day the polymer solutions were used to prepare a magnetic coating dispersion. To a 150 mL beaker was added 16.82 g of iron pigments (a generic iron pigment used in the preparation of commercial metal particle magnetic tape) and the wetting binder solution. The mixture was thoroughly stirred in order to completely wet the iron pigments. The slurry was charged to an Eiger Mini 50 mill, 25.42 g of cyclohexanone was added, and the mill was started at full speed. After ten minutes milling, a mixture of 0.33 g carbon black, 1.07 g alumina, 0.23 g stearic acid, and 0.23 g butyl stearate was added to the mill. While the milling continued, 0.46 g MONDUR CB-701 (a commercial polyisocyanate crosslinker from Mobay Coatings Division) was dissolved in the MORTHANE CA-271 binder solution. After 50 minutes milling, the MORTHANE solution was added to the mill and the milling was continued for ten more minutes. After a total of one hour of milling the dispersion was discharged into a glass bottle and ready for coating trials.

Films were coated onto 3 mil thick polyester base film by hand-drawing using a Gardner Blade. Immediately after coating the films were longitudinally oriented in a 2000 gauss magnetic field. The films were dried overnight in a convection oven at 60° C.

Example 11

COATING OF IRON PIGMENTS WITH AMINE-QUINONE COPOLYMER AQPU-8

Iron particles were prepared by reduction of iron oxide with hydrogen at 450° to 500° C. The resulting iron pigments had a specific saturation magnetization ($\sigma_s$) of 195 emu/g and were pyrophoric. The pigments were placed in a glove bag under an inert atmosphere of nitrogen and treated with a solution of amine-quinone copolymer AQPU-8 (from Example 6 above) in THF at room temperature for 24 hours. The excess solution was then decanted from the coated particles and the coated particles repeatedly rinsed with THF. The coated particles were then dried at room temperature to provide amine-quinone copolymer coated iron pigment.

Comparative Example 1

Films Containing a Conventional Metal Particle Formulation

A conventional metal particle tape formulation was used to prepare films for comparison with the films containing amine-quinone polymers. Two different binder polymer solutions were prepared: 1) a wetting binder solution containing 3.75 g UCARMAG-536 (a commercial wetting binder from Union Carbide Corporation), 3.50 g cyclohexanone, 1.75 g tetrahydrofuran, and 3.50 g toluene; and 2) a binder solution containing 4.58 g MORTHANE CA-271, 10.39 g cyclohexanone, 5.19 g tetrahydrofuran, and 10.39 g toluene. Both solutions were mixed overnight on a wrist-action shaker to effect dissolution of the polymers. The next day the polymer solutions were used to prepare a magnetic coating dispersion. To a 150 mL beaker was added 33.33 g of iron pigment and the wetting binder solution. The mixture was thoroughly stirred in order to completely wet the iron pigments. Then 0.67 g carbon black, 2.00 g alumina, 20.60 g cyclohexanone, 10.30 g tetrahydrofuran, 20.60 g toluene, and 0.42 g butyl stearate were added to the mixture. The slurry was charged to an Eiger Mini 50 mill and was milled at full speed. While the milling continued, 1.19 g MONDUR CB-701 (a commercial polyisocyanate crosslinker from Mobay Coatings Division) was dissolved in the MORTHANE CA-271 binder solution. After 50 minutes milling, the MORTHANE solution was added to the mill and the milling was continued for ten more minutes. After a total of one hour of milling the dispersion was discharged into a glass bottle and ready for coating trials.

Films were coated onto 3 mil thick polyester base film by hand-drawing using a Gardner Blade. Immediately after coating the films were longitudinally oriented in a 2000 gauss magnetic field. The films were dried overnight in a convection oven at 60° C.

Comparative Example 2

Preparation of an Amine-Quinone Polymer Containing Jeffamine D400 and p-Benzoquinone (COMP-1)

For the purposes of comparison a sample of amine-quinone polymer was prepared exactly as described in example 1 of Erhan U.S. Pat. No. 4,882,413. A 250 mL round bottom flask was charged with solution of Jeffamine D400 (16.0 g, 0.0400 mol) in 50 mL ethanol. A solution of 6.48 g (0.0600 mol) p-benzoquinone in 50 ml ethanol was added to the flask and the flask was equipped with a reflux condenser and magnetic stirring. The mixture was refluxed over a water bath for 3 hr. After 3 hr the ethanol was removed on a rotary evaporator. The residue was a viscous syrup. It was washed with cold water. The residue was dissolved in acetone, and then precipitated in hot water. The polymer was repeatedly washed with hot water until the wash water was colorless (about 5 liters of water was used). The residue was dried in a vacuum oven at 50° C. for 5 hr.

Comparative Example 3

Films Containing COMP-1 and Iron Particles

Two different binder polymer solutions were prepared: 1) a wetting binder solution contained 1.80 g of COMP-1, 16.04 g tetrahydrofuran, and 4.02 g of cyclohexanone; and 2) a binder solution contained 2.33 g of MORTHANE CA-271 (a commercial polyurethane binder from Morton International), 2.66 g tetrahydrofuran, 5.21 g cyclohexanone, and 5.26 g toluene. Both solutions were continuously mixed on the wrist-action shaker overnight to effect dissolution of the polymers. The next day the polymer solutions were used to prepare a magnetic coating dispersion. To a 150 mL beaker was added 12.02 g cyclohexanone, 1.90 g toluene, 16.82 g of iron pigments and the wetting binder solution. The mixture was thoroughly stirred in order to completely wet the iron pigments. The slurry was charged to an Eiger Mini 50 mill, 25.42 g of cyclohexanone was added, and the mill was started at full speed. After the mixture had milled for 5 min, a mixture of 0.40 g carbon black in 25.33 g tetrahydrofuran was added to the mill. After 20 min milling, a mixture of 1.15 g alumina, 0.35 g stearic acid, and 0.23 g butyl stearate was added to the mill. While the milling continued, 0.45 g MONDUR CB-701 was dissolved in the MORTHANE CA-271 binder solution. After 55 minutes milling, the MORTHANE solution was added to the mill and the milling was continued for 5 min more. After a total of one hour of milling the dispersion was discharged into a glass bottle and ready for coating trials.

Films were coated onto 3 mil thick polyester base film by hand-drawing using a Gardner Blade. Immediately after coating the films were longitudinally oriented in a 2000 gauss magnetic field. The films were dried overnight in a convection oven at 60° C.

Comparative Corrosion Studies

To demonstrate the effect of corrosion inhibition for the amine-quinone polymers of the present invention, comparative corrosion studies were undertaken. Circular samples with a 6 mm diameter were punched from the films. Magnetic hysteresis loops were measured by vibrating sample magnetometry with the applied field parallel to the direction of orientation. Initial values of saturation magnetization (MS) were obtained for each sample. The samples were soaked in pH 2.00 aqueous buffer for a period of time, removed, another hysteresis loop measured and then returned to the buffer solution. The result was a data set consisting of saturation magnetization as a function of time exposed to pH 2.00 buffer. For each sample the relative saturation magnetization was determined by dividing the values of saturation magnetization by the initial value of saturation magnetization. FIG. 1 shows a plot of the relative saturation magnetization as a function of time exposed to the buffer. When exposed to aqueous acid, iron metal corrodes according to equation 1.

$$Fe + 2H^+ \rightarrow Fe^{2+} + H_2 \qquad (1)$$

As the acid penetrated into the samples and corroded the iron particles, the saturation magnetization would decrease. In FIG. 1 the two comparative examples showed a decrease in saturation magnetization, indicating extensive corrosion. However, the three examples, two replicate AQPU-8 samples and one AQPU-4 sample, showed no significant decrease in saturation magnetization. This demonstrates that the amine-quinone polyurethane binders give a great improvement in the corrosion resistance for metal particles over a conventional metal particle binder formulations. Further more the data demonstrates that the polymers disclosed by Erhan provide no increase in corrosion protection relative to the generic metal particle binder formulations, whereas the polymers of the present invention provide a remarkable increase in corrosion protection.

COMPARATIVE MAGNETIZATION STUDIES OF COATED IRON PIGMENTS

Figure 3:
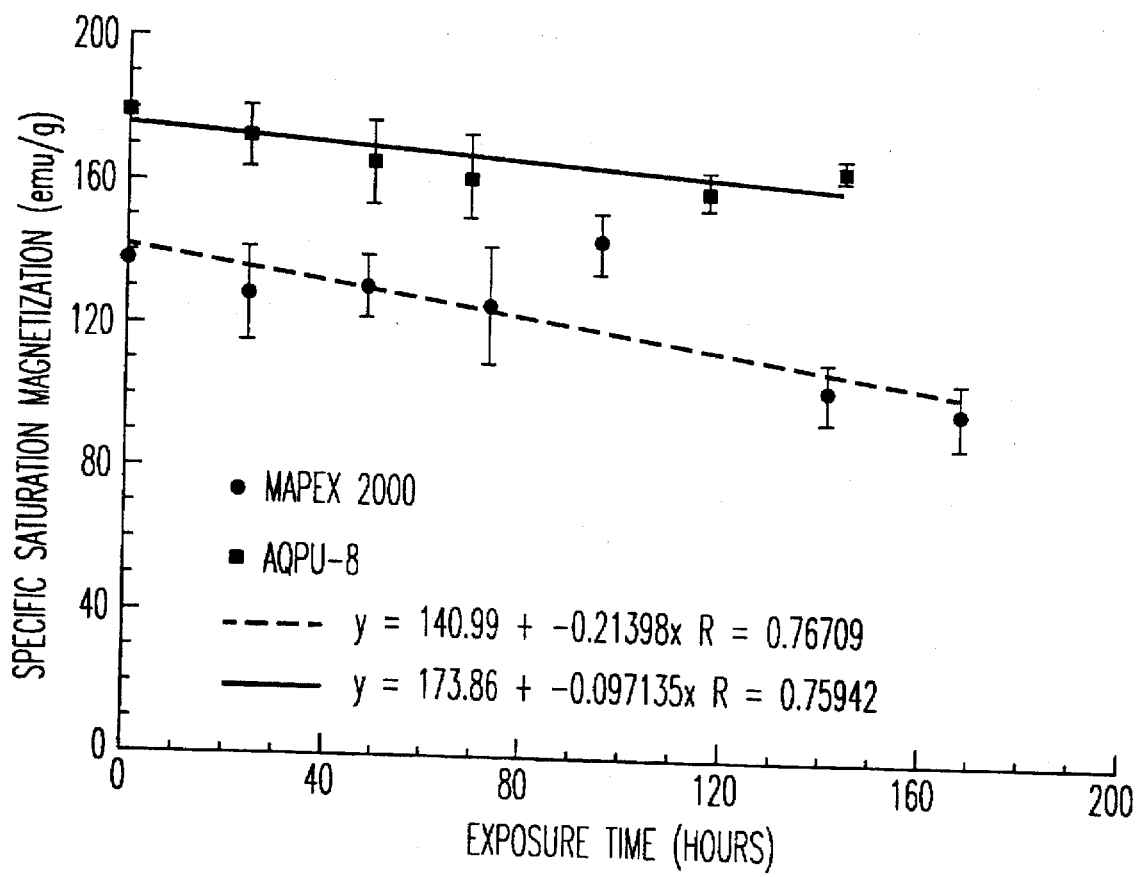
FIG. 3 is a graphical presentation of the improvement in specific saturation magnetization provided in iron particles coated with the copolymers of the present invention compared to conventional ceramic coated iron particles.

The specific saturation magnetization of the amine-quinone copolymer coated particles from Example 11 above was measured and compared with that obtained from a conventional commercial ceramic coated pigment (MAPEX 2000, available from Kanto Denka Kogyo). FIG. 3 provides the magnetization obtained for each of the coated particles as a function of exposure time when soaked in air-saturated tap water as a method for accelerated corrosion testing. As shown in the Figure, the particles coated with the copolymer of the present invention had significantly higher magnetization (160–180 emu/g) when compared to the commercial pigment (140 emu/g at best. Further the decrease in magnetization as a function of corrosion was slower for particles coated with the copolymer of the present invention compared with the conventional ceramic coated particles.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A method for maintaining the specific saturation magnetization of coated iron pigments comprising:

contacting uncoated iron pigments which have been pretreated by a reduction treatment to reduce iron oxides, with a solution of a copolymer in a solvent capable of dissolving said copolymer, wherein said copolymer is a member selected from the group consisting of:

(i) copolymers of:
(A) 3 to 60% by weight, of units derived from one or more reactive aminoquinones of formula I (I)

wherein R is hydrogen, branched, linear or cyclic $C_1$–$C_6$ alkyl, aralkyl, or phenyl which may be substituted by linear, branched or cyclic $C_1$–$C_4$ alkyl, —$NO_2$, F, $OR^2$, $NR^3{}_2$, wherein $R^2$ and $R^3$ are linear, branched or cyclic $C_1$–$C_6$ alkyl, aralkyl or phenyl, $R^1$ is a linear, branched or cyclic $C_2$–$C_{18}$ alkylene chain, phenylene, aralkylene, alkarylene, or —($CH_2CH_2$—$O)_n$—$CH_2$-$CH_2$—, wherein n is an integer from 1 to 50, X is hydroxy, epoxy, vinyl, vinyloxy, acrylate, methacrylate or acylchloro or of the formula II (II)

wherein Y is N or CH
$R^4$ is linear or branched $C_1$–$C_6$ alkyl and X is as defined above, and
(B) 40 to 97% by weight, of units derived from one or more comonomers having at least one functional group reactive with the reactive aminoquinone of part (A);

(ii) copolymers of:
(A1) one or more reactive aminoquinones of formula (IV):

(IV)

wherein R is hydrogen, branched, linear or cyclic $C_1$–$C_6$ alkyl, aralkyl, or phenyl which may be substituted by linear, branched or cyclic $C_1$–$C_4$ alkyl, —$NO_2$, F, $OR^2$, $NR^3{}_2$, wherein $R^2$ and $R^3$ are linear, branched or cyclic $C_1$–$C_6$ alkyl, aralkyl or phenyl; and
$R^7$ is —($CH_2)_n$—, phenyl (—$C_6H_4$—), —$C_6H_4$—O—$C_6H_4$—, —$C_6H_4$—CO—$C_6H_4$—, —$C_6H_4$—$SO_2$—$C_6H_4$—, biphenyl, —$CH_2$—$C_6H_4$—$CH_2$—, 2,5-tolyl-diyl, 2,4-tolyl-diyl or 2,4-anisyl-diyl; wherein n is an integer from 2 to 12; and
(B1) one or more tetracarboxylic dianhydrides; and
(iii) copolymers of:
(A2) one or more reactive aminoquinones of formula (V):

(V)

wherein R is hydrogen, branched, linear or cyclic $C_1$–$C_6$ alkyl, aralkyl, or phenyl which may be substituted by linear, branched or cyclic $C_1$–$C_4$ alkyl, —$NO_2$, F, $OR^2$, $NR^3{}_2$, wherein $R^2$ and $R^3$ are linear, branched or cyclic $C_1$–$C_6$ alkyl, aralkyl or phenyl; and $R^8$ is —O—($CH_2)_n$—, phenoxy, phenylsulfonyl or a single bond, wherein n is an integer from 2 to 12; and
(B2) one or more diamines;
under conditions sufficient to provide a coating of said copolymer on an outer surface of said iron particles; removing excess copolymer from said outer surface of said iron particles; and
drying said coated iron particles.

2. The method of claim 1, wherein said step of contacting said particles with said solution of said copolymer is performed at a temperature of from 10° C. to a boiling point of said solvent for a time of from 1 to 48 hours.

3. The method of claim 1, wherein said step of contacting said particles with said solution of said copolymer is performed at a temperature of from room temperature to 35° C. for a time of from 1 to 48 hours.

4. The method of claim 1, wherein said copolymer comprises 10 to 30% by weight of (A) and 70 to 90% by weight of (B).

5. The method of claim 1, wherein X is OH and said one or more comonomers (B) comprises
30 to 50% of a diisocyanate and
30 to 50% of a diol.

6. The method of claim 5, wherein said diisocyanate has the formula $$O{=}C{=}N{-}R^5{-}N{=}C{=}O$$

wherein $R^5$ is a linear, branched or cyclic $C_2$–$C_{18}$ aliphatic group, —$C_6H_4$—$CH_2$—$C_6H_4$—, or an aryl group which is unsubstituted, or mono or disubstituted by linear, branched or cyclic $C_1$–$C_6$ alkyl.

7. The method of claim 6, wherein said diisocyanate is a member selected from the group consisting of methylene di-p-phenyldiisocyanate, diisocyanatotoluene, isophorone diisocyanate and positional isomers thereof.

8. The method of claim 5, wherein said diol is a diol of formula HO—$R^6$—OH wherein $R^6$ is a linear, branched or cyclic $C_2$–$C_{18}$ aliphatic group or said diol is an oligomeric diol selected from the group consisting of polycaprolactone diol having a degree of polymerization of from 1 to 50, poly(butylene adipate) diol having a degree of polymerization of from 1 to 20, poly(ethylene terephthalate) diol having a degree of polymerization of from 1 to 20, poly(tetrahydrofuran) diol having a degree of polymerization of from 2 to 50, poly(1,2-butylene glycol) diol having a degree of polymerization of from 2 to 50, poly(1,2-propyleneglycol) diol having a degree of polymerization of from 2 to 1000, poly(1,3-propylene glycol) diol having a degree of polymerization of from 2 to 1000, poly(ethylene glycol) diol having a degree of polymerization of from 2 to 1000 and poly(carbonate) diol having a degree of polymerization of from 1 to 20.

9. The method of claim 1, wherein X is vinyl, vinyloxy, acrylate or methacrylate and (B) is one or more monomers selected from the group consisting of acrylates, methacrylates, $C_2$–$C_6$ olefins, styrene and vinyl naphthalene.

10. The method of claim 1, wherein X is epoxy and (B) is one or more comonomers selected from the group consisting of $C_2$–$C_4$ alkylene oxide, styrene oxide and epichlorohydrin.

11. The method of claim 1, wherein said tetracarboxylic dianhydrides (B1) are one or more members selected from the group of compounds of formulas:

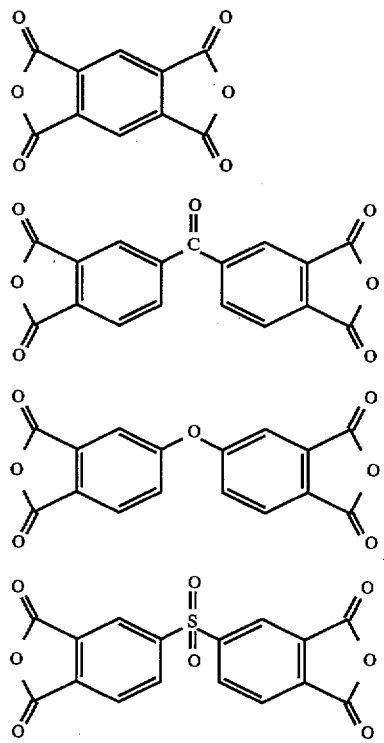

-continued

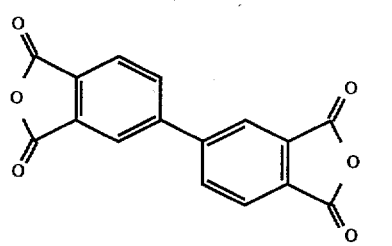

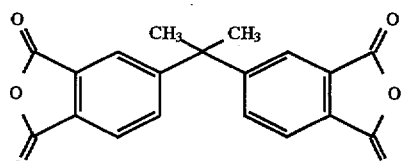

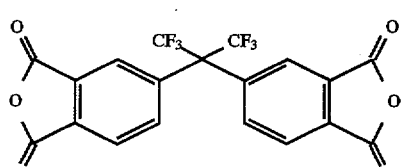

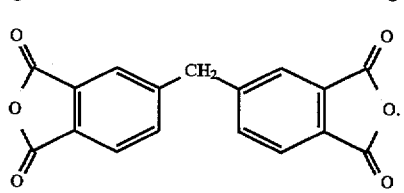

12. The method of claim 1, wherein said diamines (B2) are one or more members selected from the group consisting of 1,4-diaminobenzene, 1,3-diaminobenzene, 4,4'-diaminodiphenyl ether, 4,4'-diamino-benzophenone, 2,4-diaminotoluene, 2,5-diaminotoluene and 4,4'-diaminodiphenyl sulfone.

13. The method of claim 1, wherein said reduction treatment comprises treatment of said iron pigments with hydrogen at 450° to 500° C.

* * * * *